H. M. AUSTIN, Jr.
COMBINATION VALVE.
APPLICATION FILED NOV. 22, 1915.

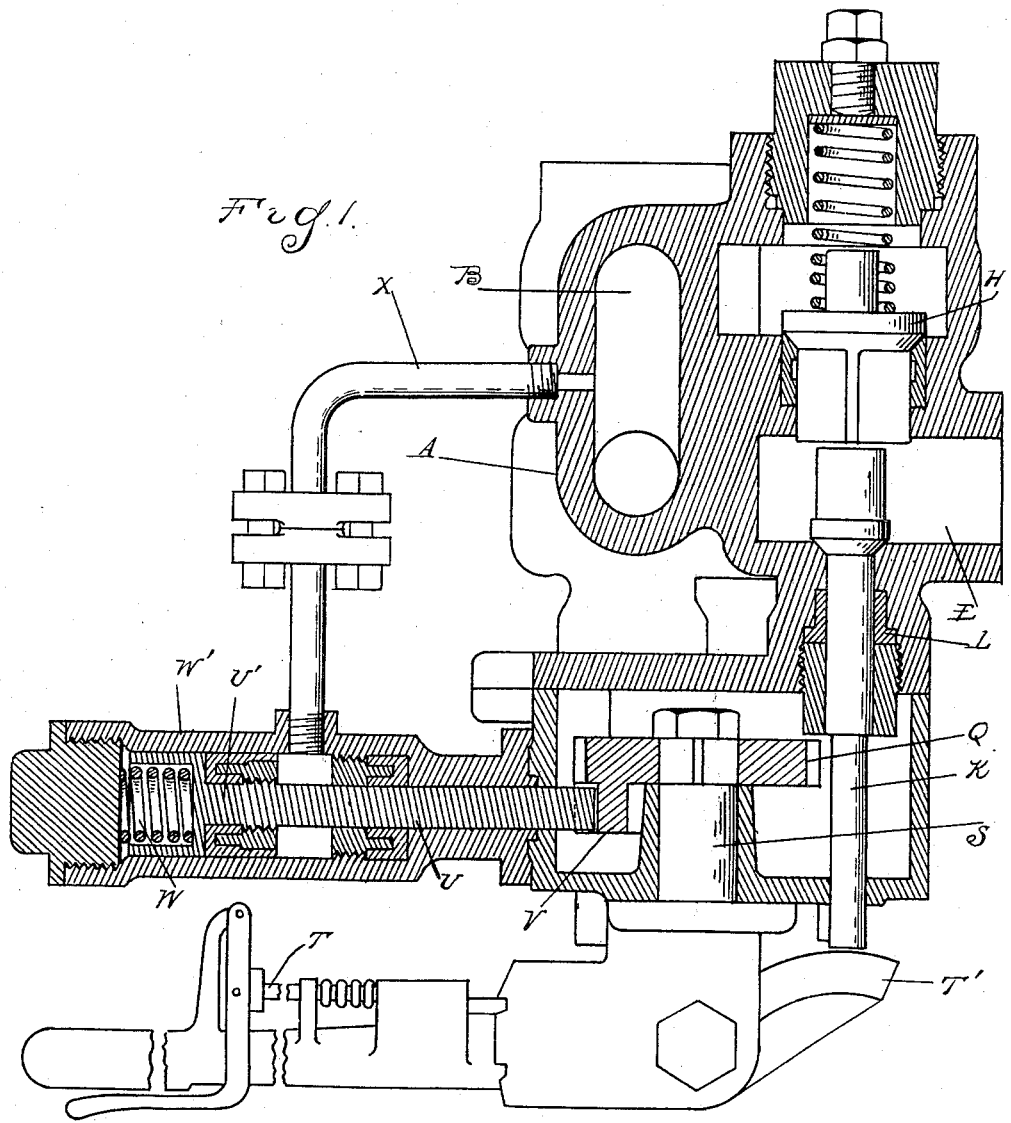

1,197,330.

Patented Sept. 5, 1916.
2 SHEETS—SHEET 2.

Inventor
Harry M. Austin, Jr.

By Whittemore Hulbert & Whittemore

Attorney

UNITED STATES PATENT OFFICE.

HARRY M. AUSTIN, JR., OF DETROIT, MICHIGAN, ASSIGNOR TO METALWOOD MFG. CO., OF DETROIT, MICHIGAN, A CORPORATION OF MICHIGAN.

COMBINATION-VALVE.

1,197,330.

Specification of Letters Patent.

Patented Sept. 5, 1916.

Application filed November 22, 1915. Serial No. 62,907.

*To all whom it may concern:*

Be it known that I, HARRY M. AUSTIN, Jr., a citizen of the United States of America, residing at Detroit, in the county of Wayne and State of Michigan, have invented certain new and useful Improvements in Combination-Valves, of which the following is a specification, reference being had therein to the accompanying drawings.

The invention relates to combination valves, designed for the control of interconnected high and low pressure systems, and the invention comprises the novel construction as hereinafter set forth.

Figure 3:
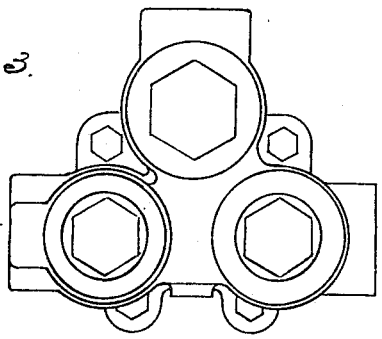
Figure 2:
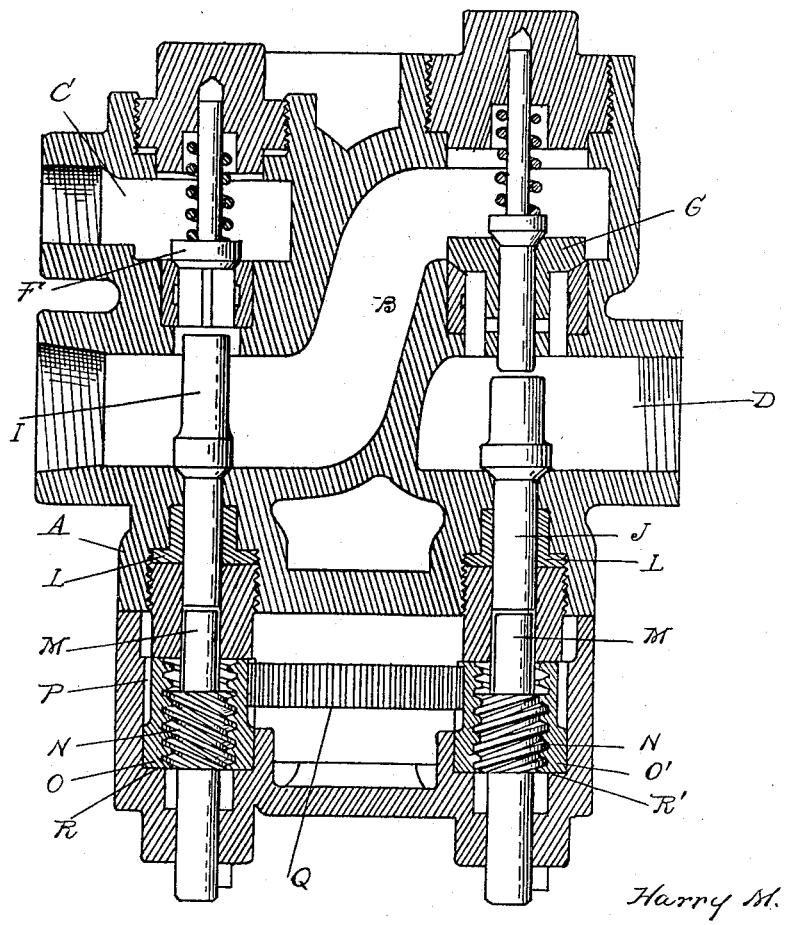

In the drawings,—Figure 1 is a longitudinal section through the valve; Fig. 2 is a cross-section thereof; Fig. 3 is a top plan view.

It is the primary object of the invention to prevent the opening of the high pressure valve while the low pressure valve is open, or the opening of the exhaust while either the high or low pressure valve is open.

As shown, A is a casing containing a chamber B for connecting with the work, and adjacent chambers C and D respectively for the high pressure and the exhaust valves. There is also a chamber E for low pressure. F, G and H are valves respectively controlling connection between the chamber B and the high pressure, exhaust and low pressure chambers. These valves are preferably arranged substantially equidistant from each other and are provided with parallelly-arranged operating stems I, J and K passing out through packing glands L.

To control the operation of the stems I, J, K, I have provided mechanism of the following construction: M are operating rods abutting against the ends of the valve stems I and J respectively and provided with a threaded portion N. O and O' are nuts engaging the threaded portions N of the respective operating rods, said nuts having gear teeth P formed on the shoulder thereof and in mesh with a common actuating gear Q. The nuts O and O' are held from end-wise movement by abutting against shoulders R and R' at opposite ends thereof formed in the casing, and consequently when rotary movement is imparted to said nuts by the member Q the rods M will be moved longitudinally and will operate the stems I and J to unseat the valves F and G. The gear wheel Q is mounted on a rock-shaft S which is actuated by suitable means such as a lever T. Provision is also made for the actuation of the valve stem K by this same actuating device for the gear wheel Q, and as shown the lever T has an arm T' which is registerable with the stem K. When in registration a tilting of the lever T will cause the rock-arm to actuate the stem K and unseat the valve H. On the other hand, a rocking of the lever T in any other position of said lever than the one in registration with said valve stem, will have no effect upon the valve.

The gear Q and rock-shaft S are normally locked from movement when the lever T is in position for registration with the stem K, this being accomplished by a locking dog U engaging a notch or shoulder on a flange V of said gear wheel Q. The dog U is normally held in engagement with its locking shoulder by the pressure of a spring W which bears against a piston U' upon said dog, operating in a cylinder W'. This cylinder is connected by a conduit X with the chamber B so that a pressure in said chamber is communicated to the cylinder and operates against the piston counter to the pressure of the spring W thereon. Thus when the pressure in said chamber B is less than the predetermined amount, the spring W will overcome it and will hold the dog U in locking engagement, but upon the rise of the pressure above said limit, the piston will overcome the spring and will release the dog.

In operation the chamber B being connected to the work and the chambers E and C respectively to the low pressure and high pressure air supply, the initial position of the parts will be as shown in Fig. 1. Here the lever T or other actuating device is in position for operation of the stem K to open the low pressure inlet valve, and thus at any time this valve may be opened and the low pressure air admitted to the work device. On first opening the valve the pressure in the chamber B will be lower than that required for actuating the piston U' to overcome the spring W, but as the pressure increases the dog will finally be released. When this occurs the lever T is capable of movement to rock the shaft S and actuate the gear wheel Q, but this movement throws the lever out of registration with the valve stem K so that the valve H is closed. The rocking of the shaft S will, through the medium of the gear wheel Q, rotate the nuts O and O′, thereby longitudinally moving the screw-threaded rods N. When said shaft is rocked in one direction motion is communicated to the rod N which actuates the stem I, unseating the high pressure valve C, thereby admitting high pressure air to the work device. The rocking of the shaft in the opposite direction will actuate the stem J to unseat the exhaust valve G, which will exhaust the pressure from the chamber B. It will be understood, however, that this exhaust valve cannot be opened when either the high pressure valve is open or the lever is in a position for operating the low pressure valve, and in the same manner it is impossible to open the high pressure valve when the low pressure valve is open. Again, it is impossible to operate the high pressure valve until the pressure admitted to the chamber B through the low pressure valve has reached a predetermined limit. This effectually prevents the wasting of the high pressure air on any work that can be performed as well by the low pressure air.

What I claim as my invention is:—

1. The combination with a casing, of a plurality of valves therein, parallelly-arranged operating rods for said valves, one of said rods having a screw-threaded portion, a revoluble nut member engaging the threaded portion of said rod and held in said casing from end-wise movement, a member for actuating another of said rods and rotatively adjustable into and out of registration therewith, and means for revolving said nut by said rotative adjustment.

2. The combination with a casing, of a plurality of valves therein, parallelly-arranged operating rods for actuating said valves, one of said rods having a threaded portion, a revoluble nut engaging said threaded portion and held from end-wise movement within said casing, said nut having a toothed periphery, a rotative toothed member intermeshing with the teeth of said nut, a member for operating another of said rods mounted on said rotative toothed member, said member being adjusted by said rotation into and out of registration with its coöperating rod, and said rotative adjustment effecting the longitudinal movement of the first-mentioned rod.

3. The combination of a casing provided with a work-connected chamber and separate high pressure, low pressure and exhaust chambers, of valves for respectively controlling connection between said high pressure, low pressure and exhaust chambers and said work-connected chamber, parallelly-arranged operating rods for said valves, the rods for said high pressure and exhaust valves having threaded portions, nuts for engaging said threaded portions held from longitudinal movement, said nuts having peripheral gear teeth, a gear wheel intermeshing with the gear teeth of said nuts, and a member for actuating the low pressure valve mounted on said gear wheel and movable therewith into and out of registration with the operating rod for said valve, the movement out of registration effecting alternatively the opening of said high pressure valve and the opening of said exhaust.

4. The combination of a casing, of a plurality of valves therein, parallelly-arranged operating rods for said valves, two of said rods having threaded portions, nuts engaging the threaded portions of said rods and held from longitudinal movement, said nuts having peripheral gear teeth, a gear wheel intermeshing with the gear teeth of said nuts, a member mounted on said gear wheel for actuating a third rod and movable with the rotation of said gear into and out of registration therewith, the movement of said gear in one direction from said point of registration effecting the opening of one of said valves and the movement in the opposite direction effecting the opening of the other of said valves.

In testimony whereof I affix my signature in presence of two witnesses.

HARRY M. AUSTIN, Jr.

Witnesses:
FRED L. KROHA,
HENRY S. KEEN.

Copies of this patent may be obtained for five cents each, by addressing the "Commissioner of Patents, Washington, D. C."